United States Patent
Yokoyama et al.

[11] Patent Number: 5,857,726
[45] Date of Patent: Jan. 12, 1999

[54] INSTRUMENT PANEL

[75] Inventors: Tetsuo Yokoyama; Mitsuhisa Fujino; Yasunobu Yamazaki, all of Okazaki, Japan

[73] Assignee: Mitsubishi Jidosha Kogyo Kabushiki Kaisha, Tokyo, Japan

[21] Appl. No.: 815,000

[22] Filed: Mar. 14, 1997

[30] Foreign Application Priority Data

Mar. 15, 1996 [JP] Japan .................................... 8-058856

[51] Int. Cl.⁶ .................................................. B60K 37/00
[52] U.S. Cl. .............................................. 296/70; 180/90
[58] Field of Search .................................. 296/70; 180/90

[56] References Cited

U.S. PATENT DOCUMENTS 1,848,377   3/1932   Novelli .................................. 296/70 X

FOREIGN PATENT DOCUMENTS 83701    7/1983   European Pat. Off. ................. 180/90
2079694  1/1982   United Kingdom ..................... 296/70

Primary Examiner—Dennis H. Pedder

[57] ABSTRACT

An instrument panel is formed symmertrically with respect to a center of the panel. The instrument panel comprises a pair of recesses defined by left and right reinforcing/partition walls, and a pair of lower openings located under the recesses. A meter unit is mounted in the recess to oppose the driver seat. An under cover is mounted in the lower opening which is to oppose the driver seat. The under cover is formed with a hole through which a steering shaft is adapted to be passed. A tray is mounted in the recess which is to oppose the front passenger seat. A glove box is mounted in the lower opening which is to oppose the front passenger seat. The walls for defining the recesses of the instrument panel have a common fixing section usable for mounting any of the meter unit and the tray.

8 Claims, 6 Drawing Sheets

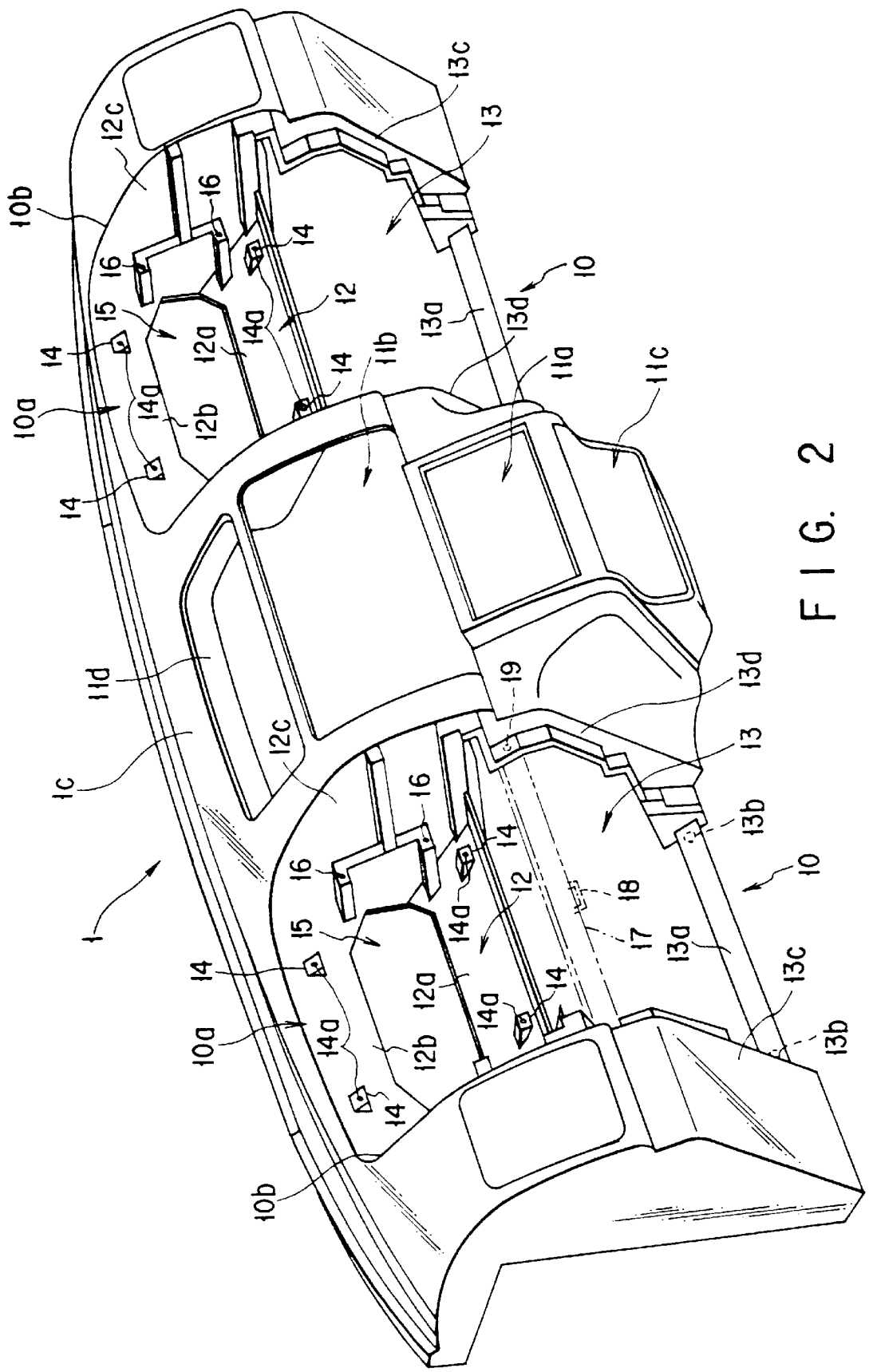
F I G. 2

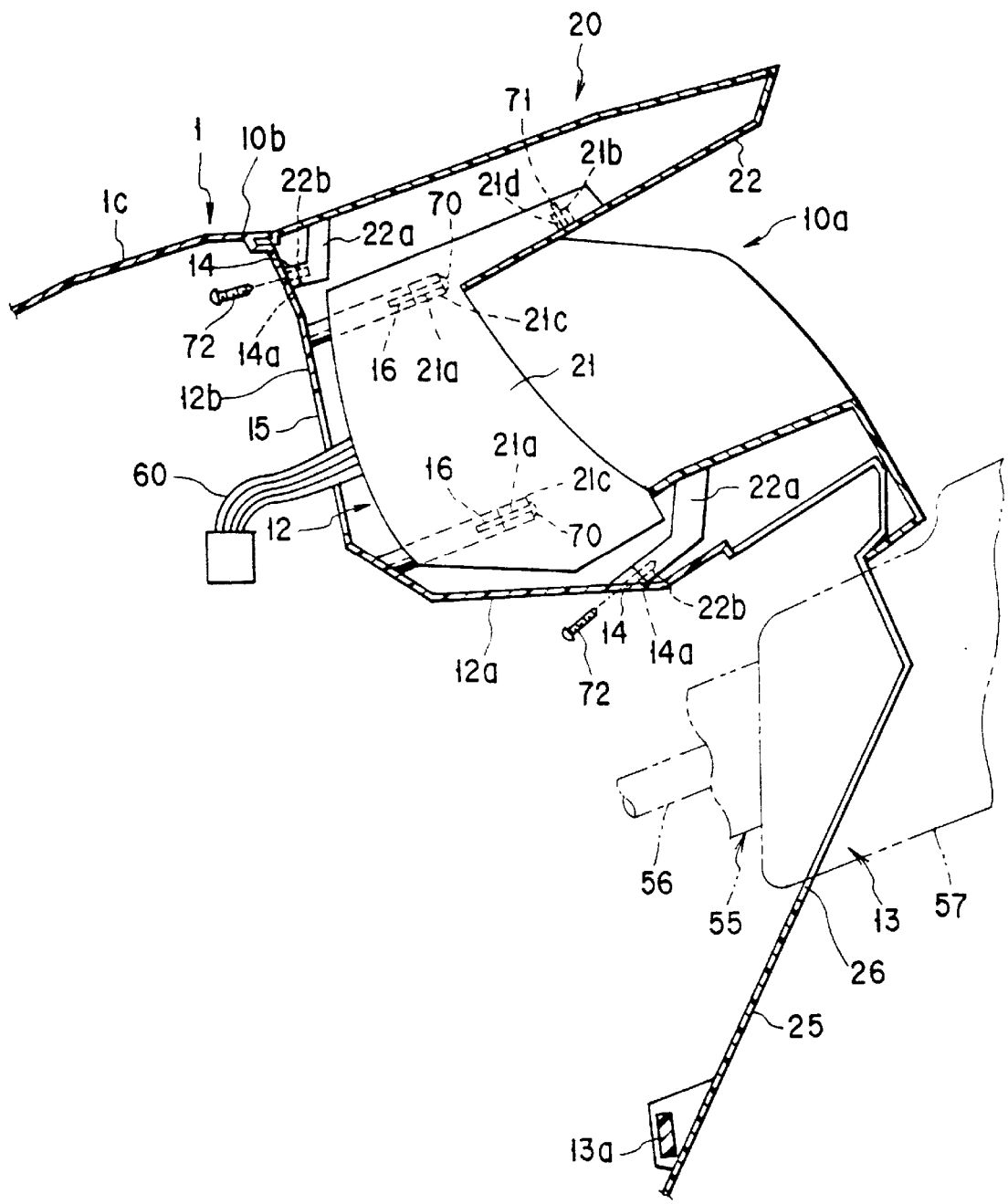
F I G. 4

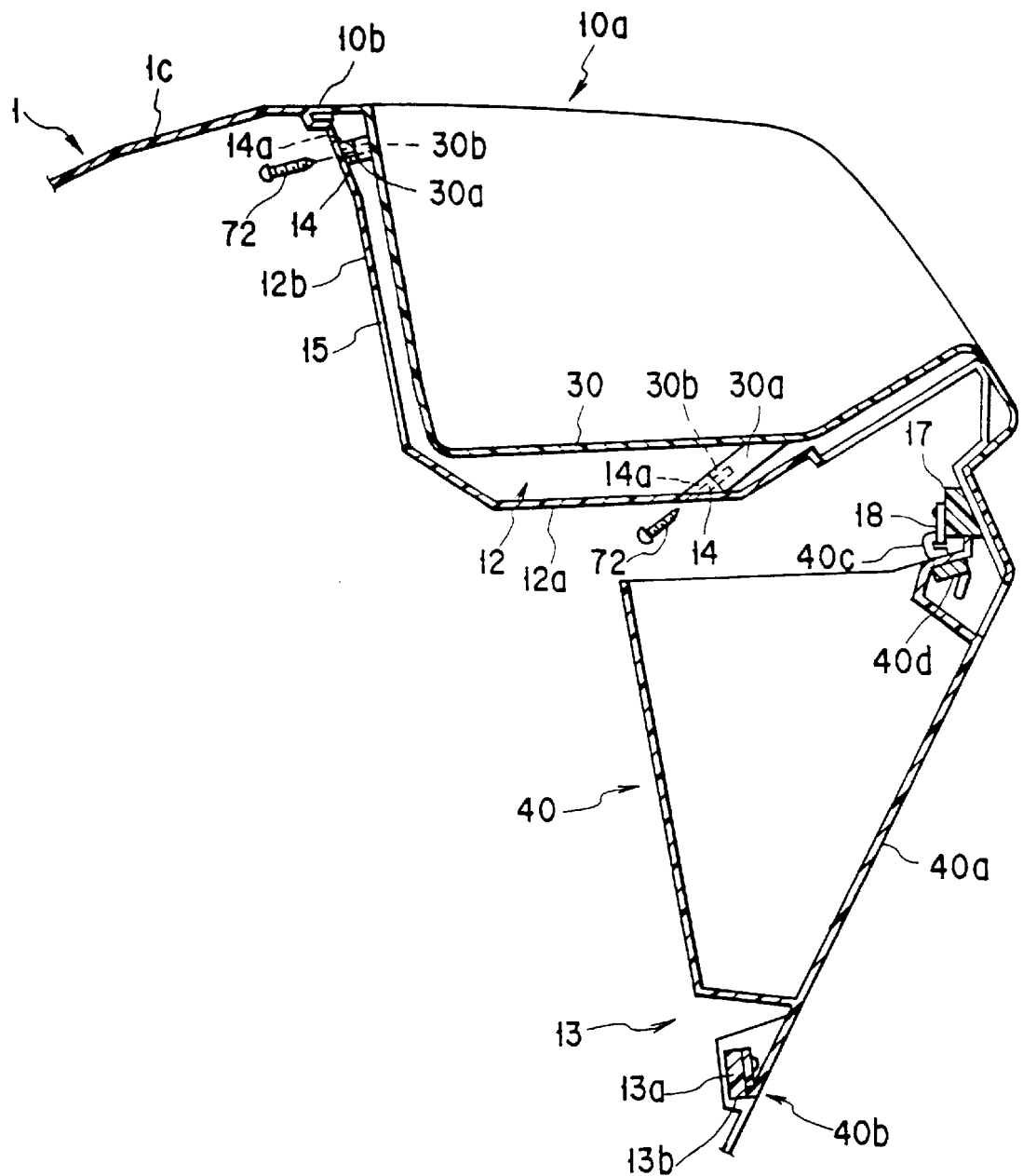
F I G. 5

INSTRUMENT PANEL

BACKGROUND OF THE INVENTION

The present invention relates to an instrument panel used for automobiles, and more in particular to an instrument panel usable for both a right-hand drive vehicle and a left-hand drive vehicle.

In Japan, running automobiles are required to keep to the left and therefore the steering wheel of the automobiles is installed on the right side of the vehicle body. In Europe and U.S.A. where the vehicles run keeping to the right, in contrast, the steering wheel is arranged on the left side of the vehicle body. As a result, the automobiles manufactured in Japan are divided into those for the domestic market required to have the steering wheel on the right side of the vehicle body (hereinafter called the right-hand drive vehicles), and those for exports to have the steering wheel on the left side of the vehicle body (hereinafter called the left-hand drive vehicles). Accordingly, the instrument panel on which the meter unit, the glove box and other parts are mounted must be supplied in two types for the right-hand drive vehicles and left-hand drive vehicles. This leads to the disadvantage of a high production cost of the instrument panel.

In view of this, an instrument panel has been suggested which allows the steering wheel apparatus to be mounted either on the right side or on the left side thereof as described in Japanese Utility Model Laid-open Publication H02-34982. This instrument panel has a notch on each of the right and left sides thereof through which a steering shaft is installed. A support bar for supporting the equipment such as the glove box is suspended between the right and left edges of each notch. This support bar includes a main bar and an auxiliary bar. The right-hand drive vehicle has the meter unit arranged on the right side and the glove box on the left side of the vehicle, while the left-hand drive vehicle has the meter unit arranged on the left side and the glove box on the right side of the vehicle.

The above-mentioned instrument panel, which has the notches to pass the steering shaft therethrough symmetrically on the right and left positions, is usable for both the right-hand drive vehicle and the left-hand drive vehicle. In spite of this, this instrument panel is not symmetric at the upper part thereof where the meter unit is mounted. In the conventional instrument panel, therefore, a hole for mounting the meter unit is required to be formed at the right or left part of the instrument panel in accordance with the (right or left) position of the steering wheel. The resulting problem is consumption of a larger processing time.

Another problem of the above-mentioned well-known instrument panel is a low rigidity due to the large opening area of the notches. Specifically, the low rigidity of the instrument panel is liable to distort the surrounding portions of the notches, often resulting in the distance changing between the right and left edges of the notch. Then, the glove box could not be accommodated in the notch or a large gap would occur between the edges of the notch and the glove box, thereby deteriorating the external appearance. Also, the low rigidity of the instrument panel causes the instrument panel to vibrate and develop noises due to the vibrations of the running vehicle and the vibrations of the engine thereof.

These problems can be solved by increasing the rigidity of the instrument panel. For the rigidity of the instrument panel to be increased, however, such measures as attaching a reinforcing member to the instrument panel or increasing the rigidity of the meter unit or the glove box are required. This leads to the problems of an increased number of manufacturing steps and a higher cost of production of the instrument panel.

BRIEF SUMMARY OF THE INVENTION

Accordingly, the object of the present invention is to provide an instrument panel high in rigidity usable for both the right-hand drive vehicle and the left-hand drive vehicle.

In order to achieve the above-mentioned object, according to the present invention, there is provided an instrument panel for use in a vehicle, having a pair of openings which are symmetrical with respect to a center of the panel, one of which is to oppose the driver seat of the vehicle and to allow passage of a steering shaft, and the other of which is to oppose the front passenger seat of the vehicle, said instrument panel comprising: an instrument panel body made of synthetic resin and extending in a cross direction of the vehicle; left and right reinforcing/partition walls provided symmetrically with respect to a center of said instrument panel body, spaced apart in the lengthwise direction of the instrument panel, extending in a longitudinal direction of the vehicle, and partitioning said openings, each into an upper section and a lower section; a first pair of side walls rising from opposing sides of the left reinforcing/partition wall and connected to a peripheral edge of said upper section and defining in cooperation with the left reinforcing/partition wall a recess for accommodating a first component which opposes the driver seat; a second pair of side walls rising from opposing sides of the right reinforcing/partition wall and connected to a peripheral edge of said upper section and defining in cooperation with the right reinforcing/partition wall a recess for accommodating a second component which opposes the front passenger seat; and a steering shaft guiding section located in the lower sections of said opening which is to oppose the driver seat, for allowing passage of the steering shaft.

In this aspect of the invention, a single type of instrument panel can be used for both the right-hand drive vehicle and the left-hand drive vehicle.

According to another aspect of the invention, there is provided an instrument panel comprising rear walls connected to the partition walls and the side walls for further facilitating the mounting of the first equipment and the second equipment, wherein the partition walls and/or the rear walls include a common fixing section capable of fixing the first equipment and the second equipment, and the first and second equipment each has a mounting section adapted to couple to the common fixing section at a position corresponding to the common fixing section.

With this configuration, even in the case where the first equipment and the second equipment are mounted at reverse lateral positions, the common fixing means permits each equipment to be mounted snugly in each recess. As a result, the number of manufacturing steps required for mounting the equipments is reduced for a lower cost of the instrument panel. Further, the rigidity of the instrument panel can be increased by forming the instrument panel body integrally with the partition walls and the side walls which define the recesses.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a perspective view of the instrument panel shown in FIG. 1;

FIG. 4 is a sectional view taken in line IV—IV in FIG. 3;

FIG. 5 is a sectional view taken in line V—V in FIG. 3; and

DETAILED DESCRIPTION OF THE INVENTION

Figure 1:
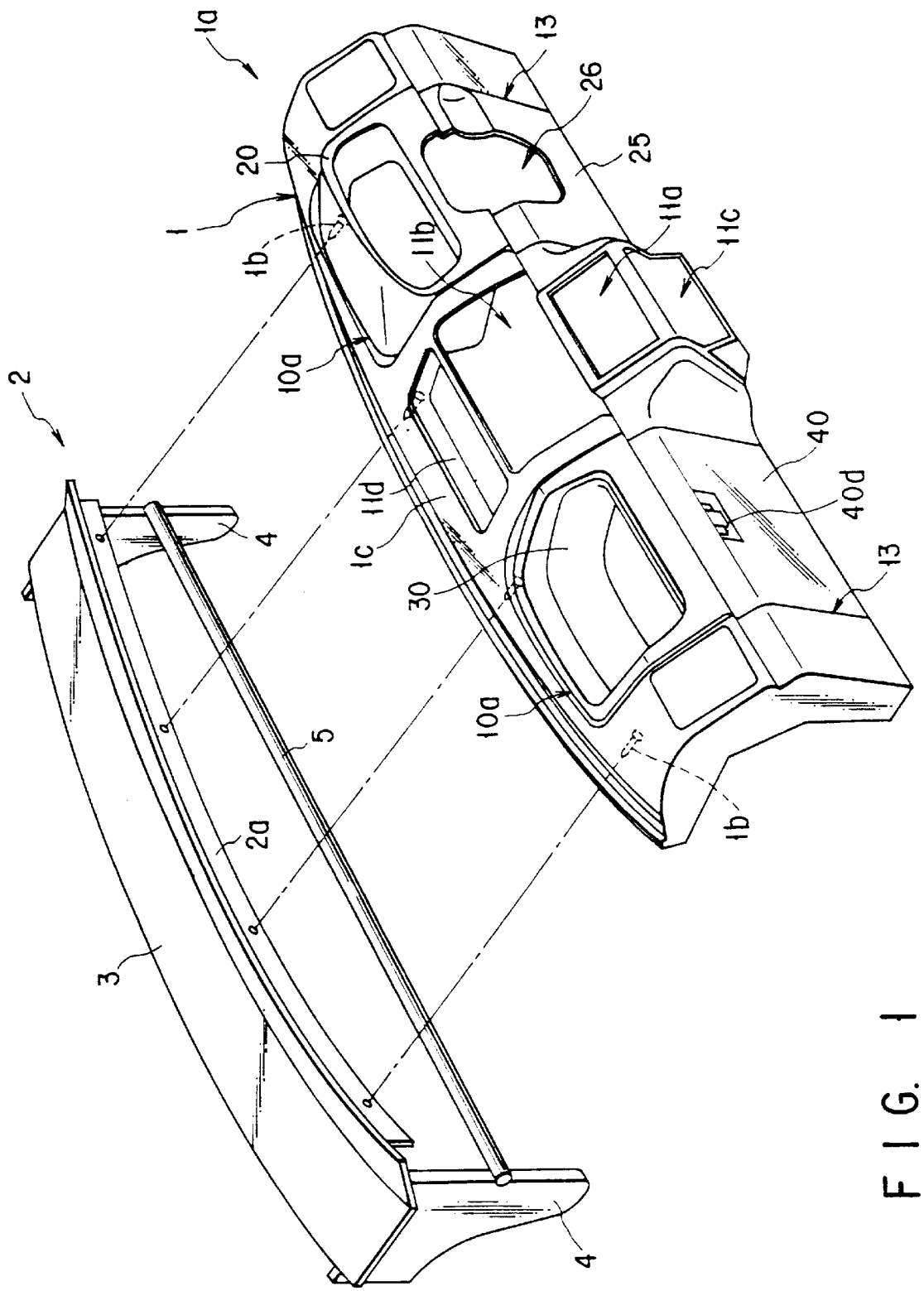
FIG. 1 is a perspective view showing an instrument panel unit including an instrument panel and a vehicle body frame section according to an embodiment of the present invention.

An embodiment of the present invention will be described below with reference to the accompanying drawings. FIG. 1 shows an instrument panel unit 1a according to the invention and a frame section 2 constituting a part of the vehicle body. The instrument panel unit 1a includes an instrument panel 1 and equipments mounted on the instrument panel 1. The equipments include a meter unit 20, an under cover 25, a tray 30, and a glove box 40, to mention a few. The instrument panel 1 also includes an instrument panel body 1c of synthetic resin extending in the transverse direction (cross direction) of the vehicle. The under cover 25, the tray 30 and the glove box 40 are also mainly made of synthetic resin.

Figure 6:
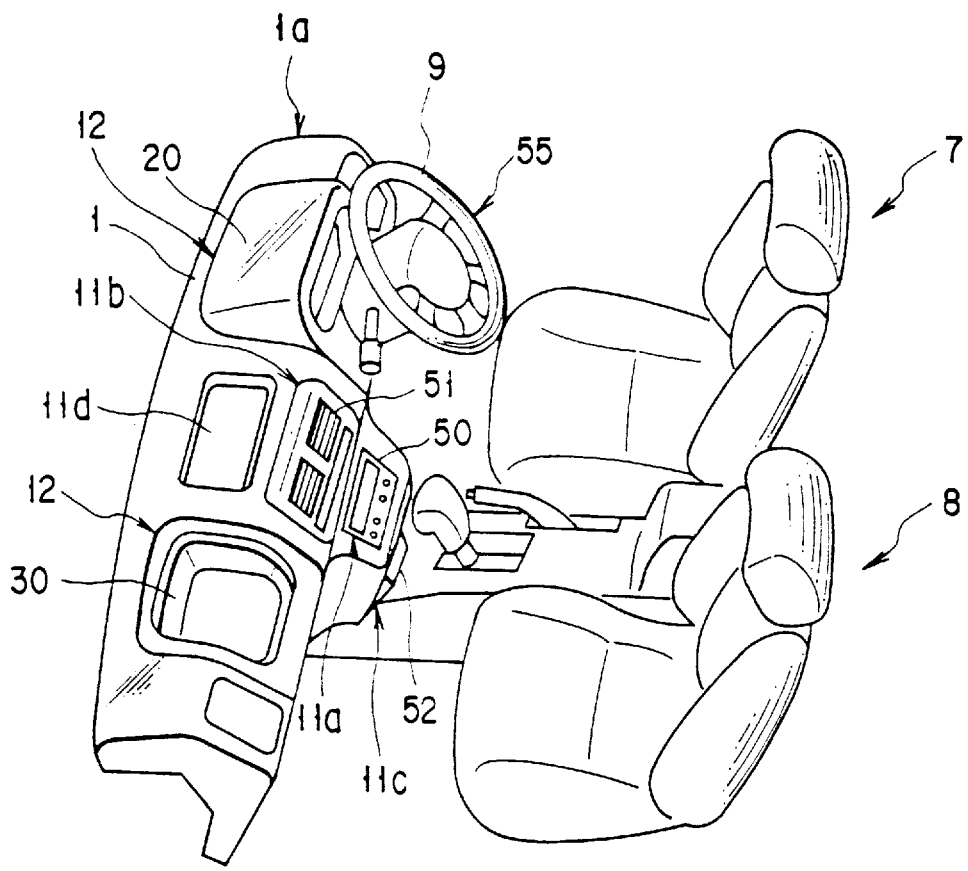
FIG. 6 is a perspective view of the interior of an automobile including the instrument panel unit shown in FIG. 1.

As shown in FIG. 6, the instrument panel unit 1a is arranged in front of the driver seat 7 and the front passenger seat 8 of a passenger car or the like automobile. FIG. 6 shows a right-hand drive vehicle, and therefore has the driver seat 7 on the right side thereof. The front passenger seat 8 is located on the left side of the vehicle body. As a result, the steering wheel 9 is arranged on the right side of the instrument panel 1.

The frame section 2 shown in FIG. 1 is located forward of the compartment, i.e., in front of the instrument panel unit 1a. The instrument panel unit 1a is fixed on the edge 2a of the frame section 2 by a fixing means 1b such as a screw or a clip. The frame section 2 made of a metal material is fixedly welded to the dash panel of the vehicle body. The frame section 2 includes a cowl top 3 extending in the transverse direction of the vehicle, a pair of right and left side panels 4 fixed on the ends of the cowl top 3, respectively, and a cross member 5. The cross member 5 extends in a direction substantially parallel to the cowl top 3. The ends of the cross member 5 are fixed on the right and left side panels 4, respectively.

FIG. 2 shows the instrument panel 1 in enlarged form. The instrument panel 1 is formed in laterally symmetric fashion. The instrument panel 1 is formed integrally of a synthetic resin material by the well-known injection molding. A pair of openings 10 of the same shape are formed on the portions of the instrument panel 1 opposed to the driver seat and the front passenger seat, respectively. The openings 10 each include an upper section 10a and a lower section 13 as described later.

The central portion of the instrument panel 1 in the transverse direction of the vehicle is formed with equipment compartments 11a, 11b, 11c and a tray 11d. As shown in FIG. 6, the first equipment compartment 11a accommodates an audio control unit 50. The second equipment compartment 11b holds an air conditioner control unit 51 or the like. The third equipment compartment 11c holds an ash tray 52.

Figure 3:
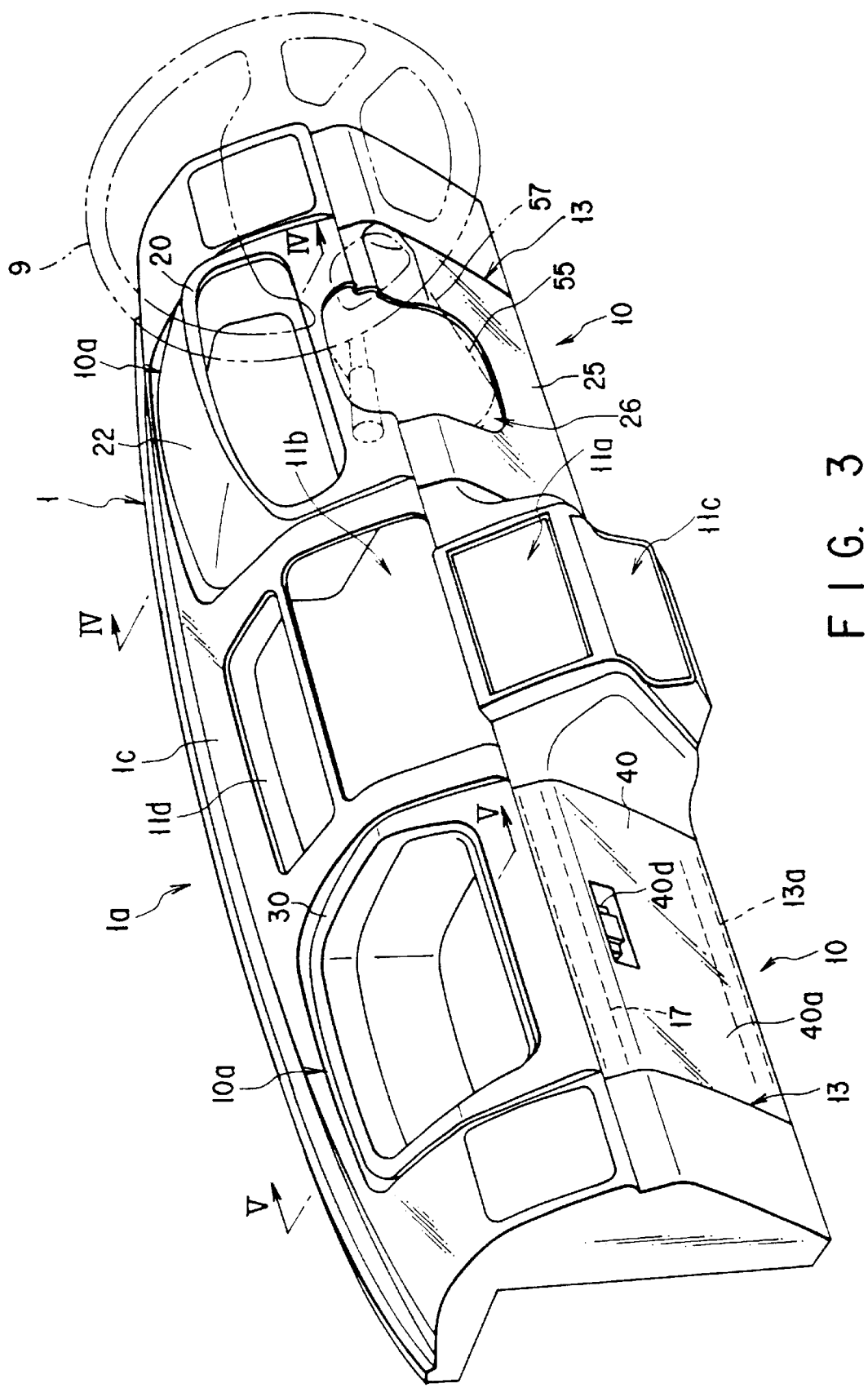
FIG. 3 is a perspective view showing the instrument panel unit of FIG. 1 in an enlarged form.

Now, the opening pair 10 will be explained. The right opening 10 and the left opening 10 have the same configuration. One of the opening 10 will therefore be explained. FIG. 3 shows the instrument panel unit 1a for the right-hand drive vehicle. As shown in FIGS. 3 and 4, the right opening 10 in opposed relation to the driver seat accommodates the first equipments such as the meter unit 20 and a steering shaft assembly 55, for example.

The steering shaft assembly 55 includes a steering shaft 56 and a column cover 57 for covering the steering shaft 56. The under cover 25 is formed with a hole 26 functioning as a steering shaft guiding section for passing the steering shaft assembly 55 therethrough. As shown in FIGS. 3 and 5, the left opening 10 in opposed relation to the front passenger seat accommodates a tray 30 as an example of the second equipments and a glove box 40.

As shown in FIGS. 2, 4 and 5, the openings 10 each include the upper section 10a for accommodating the meter unit 20 or the tray 30 and the lower section 13 for accommodating the under cover 25 or the glove box 40. The upper section 10a and the lower section 13 of the opening 10 are defined from each other by a reinforcing/partition wall 12a extending depthwise direction of the instrument panel (longitudinal direction of the vehicle). Side walls 12c rise from the right and left sides, respectively, of the reinforcing/partition wall 12a. The upper portion of each side wall 12c is connected to the peripheral edge 10b of the upper section 10a of the opening 10. A rear wall 12b is located behind the partition wall 12a.

The partition wall 12a, the rear wall 12b and the side walls 12c define a recess 12. The walls 12a, 12b and 12c are formed laterally symmetrically about the center of the instrument panel body 1c in the transverse direction of the vehicle. The walls 12a, 12b and 12c and the instrument panel body 1c are formed integrally with each other, so that the rigidity of the instrument panel 1, or especially, the rigidity around the openings 10 is improved. The lower section 13 of the opening 10 is defined by a reinforcing member 13a described later and a pair of vertical walls 13c, 13d connected to the ends of the reinforcing member 13a.

As shown in FIG. 4, the meter unit 20 includes a meter body having a speedometer and a fuel gauge and a meter cover 22 of synthetic resin for covering the meter body 21. The meter body 21 in turn includes a mounting section 21c having mounting holes 21a used for mounting the meter body 21 on the instrument panel 1, and a boss portion 21b. The boss portion 21b is formed with a threaded hole 21d used for coupling with the meter cover 22. The meter cover 22 is formed integrally with a boss portion 22a having a threaded hole 22b for mounting the meter cover 22 on the instrument panel 1. The boss portion 22a functions as a mounting section for fixing the meter cover 22 on a boss portion 14 described below.

As shown in FIG. 5, the tray 30 is integrally formed with a plurality of boss portions 30a each having a threaded hole 30b used for mounting the tray 30 on the instrument panel 1. The boss portions 30a function as a mounting section for fixing the tray 30 on the boss portions 14. The glove box 40 includes a openable lid 40a, a hinge mechanism 40b, a latch mechanism 40*c* capable of holding the lid 40*a* in closed state, and a handle 40*d*.

The recess 12 is located at the upper portion of the instrument panel 1. The reinforcing/partition wall 12*a* and the rear wall 12*b* defining the recess 12 are formed with a plurality of boss portions 14 making up a common fixing section used for mounting the meter cover 22 or the tray 30. The boss portions 14 each have a mounting hole 14*a*. As shown in FIG. 4, the rear wall 12*b* is formed with an opening 15 through which the electric cables 60 led out of the meter body 21 is adapted to be passed. The side wall 12*c* of the recess 12 is formed with a plurality of threaded portions 16 constituting fixing means used for mounting the meter body 21.

The lower section 13 of the opening 10 is formed under the recess 12, i.e., just under the reinforcing/partition wall 12*a*. The lower section 13 of the opening 10 has at the lower portion thereof a reinforcing member 13*a* formed integrally with the instrument panel body 1*c* for improving the rigidity of the instrument panel 1. A hinge fixing section 13*b* is formed at each of the ends of the reinforcing member 13*a*. The hinge fixing sections 13*b* are used for mounting the hinge mechanism 40*b* in the case where the glove box 40 is arranged in the lower section 13 of the opening 10.

Another reinforcing member 17 is interposed between the recess 12 and the lower section 13 of the opening 10 as a reinforcing means for increasing the rigidity of the instrument panel 1. The reinforcing member 17 has a striker 18. A latch mechanism 40*c* comes to engage the striker 18 to hold the lid 40*a* of the glove box 40 in closed state. This striker 18 functions as a means of locking the lid 40*a*. The handle 40*d* is used for removing the latch mechanism 40*c* from the striker 18. The reinforcing member 17 is fixed on the vertical walls 13*c*, 13*d* of the instrument panel 1 by a fixing means 19 such as a screw. The reinforcing member 17 can further increase the rigidity of the instrument panel 1.

Now, an application of the instrument panel 1 to the right-hand drive vehicle will be explained. As shown in FIG. 6, the meter unit 20 is mounted in the right recess 12 of the instrument panel 1 in opposed relation to the driver seat 7. As shown in FIG. 4, the meter body 21 of the meter unit 20 is fitted in the recess 12. After that, the meter body 21 is fixed on the threaded portions 16 of the instrument panel 1 by screws 70 from the front side of the instrument panel 1. The electric cables 60 extending out from the rear surface of the meter body 21 are led out toward the rear side of the instrument panel 1 through the opening 15.

The meter cover 22 is applied over the meter body 21 from above the meter body 21. The meter body 21 and the meter cover 22 are fixed to each other by a screw 71. The screw 71 is forced into the threaded hole 21*d* of the boss portion 21*b*. The meter cover 22 is fixed on the boss portions 14 by screws 72 from the rear side of the instrument panel 1. This screws 72 are forced into the threaded holes 22*b* of the boss portions 22*a* through the mounting holes 14*a* of the boss portions 14. The under cover 25 is mounted in the right lower section 13 of the opening 10 of the instrument panel 1 opposed to the driver seat 7. The under cover 25 is fixed on the instrument panel 1 by a screw or a clip not shown. The vertical walls 13*c* and 23*d* are connected to each other by the under cover 25.

As shown in FIG. 6, the tray 30 is fitted in the left recess 12 of the instrument panel 1 in opposed relation to the front passenger seat 8. As shown in FIG. 5, the tray 30, after being fitted in the recess 12, is fixed on the boss portions 14 by the screws 72 from the rear side of the instrument panel 1. The screws 72, like the screws 72 used for mounting the meter cover 22, are forced into the threaded holes 30*b* of the boss portions 30*a* through the mounting hole 14*a*.

The glove box 40 is fitted in the left lower section 13 of the opening 10 of the instrument panel 1 in opposed relation to the front passenger seat 8. Before fitting the glove box in the lower section 13 of the opening 10, the reinforcing member 17 is fixed on the instrument panel 1 by a fixing means 19 (shown in FIG. 2). This reinforcing member 17 is suspended in horizontal direction between the lower section 13 of the opening 10 and the recess 12 of the instrument panel 1. After mounting the reinforcing member 17 on the instrument panel 1, the hinge mechanism 40*b* of the glove box 40 is mounted on the hinge fixing sections 13*b* of the reinforcing member 13*a*. When the glove box 40 is forced into the lower section 13 of the opening 10, the latch mechanism 40*c* of the glove box 40 engages the striker 18 of the reinforcing member 17. In this way, the lid 40*a* is held in closed state. As shown in FIG. 6, an audio control unit 50, an air conditioner control unit 51, an ash tray 52, etc. are mounted on the equipment accommodation units 11*a*, 11*b*, 11*c*, respectively, of the instrument panel 1.

In the case where the instrument panel 1 is used with the left-hand drive vehicle, the relative positions of the meter unit 20, the under cover 25, the tray 30 and the glove box 40 are reversed to those for the right-hand drive vehicle. A pair of the recesses 12 have the same shape, and so do the right and left lower sections 13 of the openings 10. In addition, this instrument panel 1 includes the boss portions 14 usable as a common fixing means for mounting both the meter unit 20 and the tray 30. As a result, the meter unit 20, the under cover 25, the tray 30 and the glove box 40 can be mounted in the same manner as in the case of the right-hand drive vehicle. Specifically, the instrument panel 1 can be used for both the right-hand drive vehicle and the left-hand drive vehicle without additional labor. The recess 12 in opposed relation to the front passenger seat may accommodate an air-bag unit for front passenger as an example of the second equipment in place of the tray 30.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

We claim:

1. An instrument panel for use in a vehicle, having a pair of openings which are symmetrical with respect to a center of the panel, one of which is to oppose the driver seat of the vehicle and to allow passage of a steering shaft, and the other of which is to oppose the front passenger seat of the vehicle, said instrument panel comprising:

an instrument panel body made of synthetic resin and extending in a cross direction of the vehicle;

left and right reinforcing/partition walls provided symmetrically with respect to a center of said instrument panel body, spaced apart in the lengthwise direction of the instrument panel, extending in a longitudinal direction of the vehicle, and partitioning said openings, each into an upper section and a lower section;

a first pair of side walls rising from opposing sides of the left reinforcing/partition wall and connected to a peripheral edge of said upper section and defining in cooperation with the left reinforcing/partition wall a recess for accommodating a first component which opposes the driver seat;

a second pair of side walls rising from opposing sides of the right reinforcing/partition wall and connected to a peripheral edge of said upper section and defining in cooperation with the right reinforcing/partition wall a recess for accommodating a second component which opposes the front passenger seat; and a steering shaft guiding section located in the lower sections of said opening which is to oppose the driver seat, for allowing passage of the steering shaft.

2. An instrument panel according to claim 1, further comprising rear walls connected to said reinforcing/partition walls and said side walls, wherein at least one of said reinforcing/partition walls and said rear walls include a common fixing means capable of fixing either of said first and second components, said first component and said second component each having a mounting section to be coupled to said common fixing means at a position corresponding to said common fixing means.

3. An instrument panel according to claim 1, wherein said reinforcing/partition walls and said side walls are formed integrally with said instrument panel body.

4. An instrument panel according to claim 1, wherein a glove box having an openable lid is fitted in the lower section of said opening which is to oppose to the front passenger seat, and a reinforcing member having a lock means for holding said lid in closed state is interposed between said upper section and said lower section of said opening.

5. An instrument panel according to claim 1, wherein a meter unit constituting one of said first component is mounted in said recess which is in opposing relation to the driver seat.

6. An instrument panel according to claim 2, wherein said reinforcing/partition walls, said rear walls and said side walls are formed integrally with said instrument panel body.

7. An instrument panel according to claim 1, further comprising a pair of right and left vertical walls for defining the two sides of each of said lower sections of said openings, and an under cover mounted in the lower section of said opening which is to oppose the driver seat, for connecting the vertical walls, said under cover being formed with a hole constituting said steering shaft guiding section.

8. An instrument panel according to claim 1, further comprising a pair of right and left vertical walls for defining the two sides of each of said lower sections of said openings, wherein the lower section of said opening which is to oppose the front passenger seat includes a reinforcing member connected to said vertical walls.

* * * * *